(12) United States Patent
Hewitt et al.

(10) Patent No.: US 6,527,333 B2
(45) Date of Patent: Mar. 4, 2003

(54) SOLID STATE DRAG REDUCING VEHICLE GRILLE

(75) Inventors: L. Bradley Hewitt, Ann Arbor, MI (US); Edward J. Zeuty, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,501

(22) Filed: Apr. 18, 2001

(65) Prior Publication Data

US 2002/0153746 A1 Oct. 24, 2002

(51) Int. Cl.[7] ............................................. B60R 19/02
(52) U.S. Cl. ................... 296/180.1; 293/115; 180/68.6; 52/473
(58) Field of Search ............................. 180/68.6, 68.1; 296/180.1, 194; 52/473; 293/115

(56) References Cited

U.S. PATENT DOCUMENTS

| 4,143,732 A | * | 3/1979 | Schmude et al. |
| 4,325,283 A | * | 4/1982 | Bemiss |
| 4,334,588 A | * | 6/1982 | Tezuka et al. |
| 4,457,558 A | * | 7/1984 | Ishikawa |
| 4,957,325 A | * | 9/1990 | Engel |
| 5,516,178 A | * | 5/1996 | Grant |
| 5,688,020 A | * | 11/1997 | Burg |
| 6,012,761 A | * | 1/2000 | Hellhake et al. |

FOREIGN PATENT DOCUMENTS

JP          56-31844          *   3/1981

* cited by examiner

Primary Examiner—Joseph D. Pape
(74) Attorney, Agent, or Firm—Gigette M. Bejin

(57) ABSTRACT

A solid state drag reducing vehicle grille for a vehicle includes a front bumper carried by the vehicle, left and right grille portions carried by the vehicle situated above the front bumper, and slats carried by the left and right grille portions wherein the slats are adapted to allow air to flow through at low vehicle speeds and to partially redirect airflow at high vehicle speeds.

13 Claims, 2 Drawing Sheets

SOLID STATE DRAG REDUCING VEHICLE GRILLE

BACKGROUND OF INVENTION

The present invention relates to vehicle grilles, and more specifically, to a solid-state drag reducing vehicle grille.

Automotive vehicles typically have a radiator for cooling the engine. The radiator is commonly situated behind a grille. The grille permits air to flow through and to the radiator as the vehicle moves forward, thus providing an engine cooling benefit. More specifically, vehicle grilles allow oncoming air to flow through to contact and cool the radiator fins, which in turn cool the radiator fluid that cools the engine.

Typically, the location and size of the grille are preferably designed to meet the low speed cooling requirements. The engine cooling requirements are only marginally higher with increased vehicle speed. However, as the vehicle velocity increases so does the amount of airflow into the engine compartment, which slows the vehicle and makes the engine work harder.

The additional airflow at higher vehicle speeds is also detrimental to fuel economy. As vehicle velocity increases, the amount of vehicle aerodynamic drag as a result of the increased airflow into the engine compartment increases. As aerodynamic drag increases, more energy is required to move the vehicle.

To compensate for these detriments, grille covers have been employed in the past to limit the amount of airflow into the engine compartment. However, this approach requires physical manipulation by the operator and has been used mainly on heavy-duty trucks to limit the amount of cold air into the engine compartment. Active grille shutters have also been used in the past to remedy these problems. Such a design is very costly and uses moving shutters, which are controlled by the engine, to actively limit the amount of air allowed into the engine compartment. These designs are complex and prone to failure over time.

It is therefore desired to have airflow through the grille at low and high vehicle speeds to cool the engine, but to redirect the excess airflow that occurs at high vehicle speeds that is not needed. It would therefore be beneficial to have a passive vehicle grille system with a solid-state design having no moving parts that allows sufficient airflow at lower speeds while actively managing airflow at higher speeds, thereby reducing aerodynamic drag and improving fuel economy and vehicle stability. High cost and complexity are also overcome with such a passive system.

SUMMARY OF INVENTION

It is an object of the present invention to provide a solid-state drag reducing vehicle grille that overcomes the disadvantages of the prior art.

It is a feature of the present invention that the solid state drag reducing vehicle grille's slats have predetermined angles and lengths to allow normal airflow through the grille at lower vehicle speeds while actively redirecting airflow up and over the hood at high vehicle speeds, thereby reducing drag and improving fuel economy.

The present invention advantageously provides a solid state drag reducing vehicle grille for a vehicle including a front bumper carried by the vehicle, left and right grille portions carried by the vehicle situated above the front bumper, and slats carried by the left and right grille portions wherein the slats are adapted to allow air to flow through at low vehicle speeds and to partially redirect airflow at high vehicle speeds.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
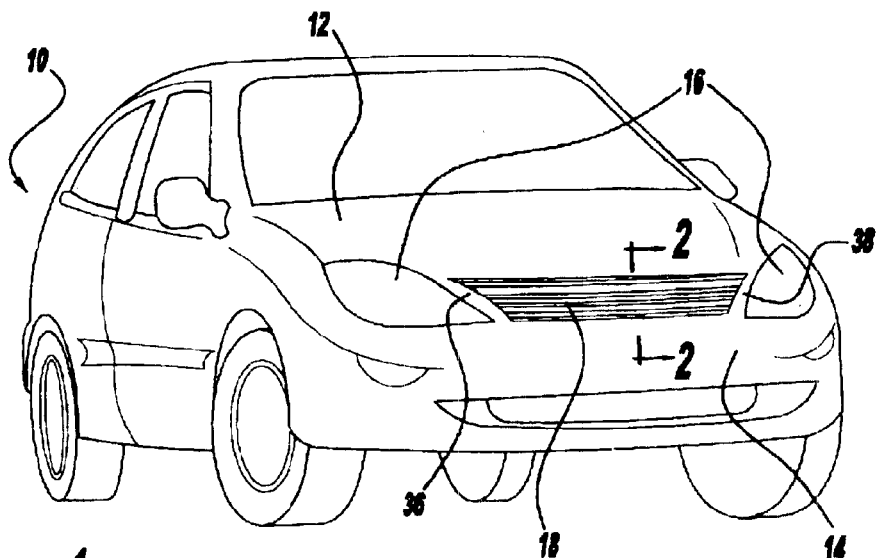
FIG. 1 is a perspective view of a vehicle with a solid-state drag reducing vehicle grille according to the present invention.

In FIG. 1, a vehicle 10 having a hood 12, a front bumper 14, and headlights 16 is shown. Situated between the headlights 16, above the front bumper 14, and below the hood 12 is a solid-state drag reducing vehicle grille 18. The solid-state drag reducing vehicle grille 18 is situated in front of a radiator (not shown). The solid-state drag reducing vehicle grille 18 allows airflow through and to the radiator to meet cooling requirements for the vehicle 10 at different speeds.

Figure 2:
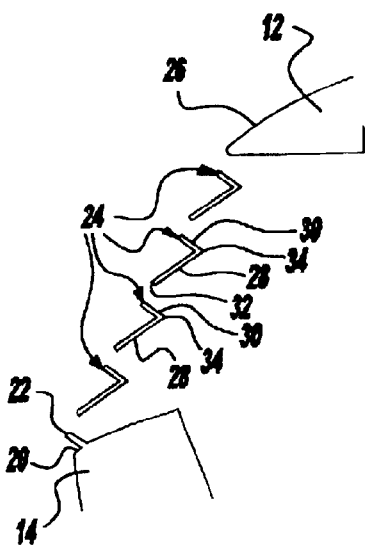
FIG. 2 is a cross-sectional view along line 2—2 of FIG. 1 of a solid-state drag reducing vehicle grille according to the present invention.

A closer look at the solid-state drag reducing vehicle grille 18 can be seen in FIG. 2. The front bumper 14 has an upper surface 20 from which an upwardly and forwardly directed fin 22 of predetermined thickness extends a predetermined distance. The components thereafter that comprise the solid-state drag reducing vehicle grille 18 are a series of a predetermined number of slats 24. From the fin 22, the first slat 24 is situated a predetermined distance above and a predetermined distance rearward of the fin 22. From the first slat 24, the second slat 24 is then situated a predetermined distance above and a predetermined distance rearward of the first slat 24, and so on, up to the last slat 24. The last slat 24 is situated such that a top surface 26 of the hood 12 is a predetermined distance above and a predetermined distance rearward of the last slat 24.

The slats 24 are substantially L-shaped in cross-section and each has a lower portion 28 and an upper portion 30. In cross-section, other shapes are possible, such as a curved shape, without departing from the scope of the present invention. The lower portions 28 have a front end 32 from which the lower portions 28 extend upwardly and rearward a predetermined distance. The lower portions 28 have a rear end 34 from which the upper portions 30 extend upwardly and forwardly a predetermined distance less than the lower portions 28. As seen in FIG. 1, the slats 24 extend the entire length of the solid state drag reducing vehicle grille 18, and are each connected to a left grille portion 36 and a right grille portion 38 so that the slats 24 and the left and right grille portions 36 and 38 are combined to form the one-piece solid-state design of the solid state drag reducing vehicle grille 18.

Figure 3:
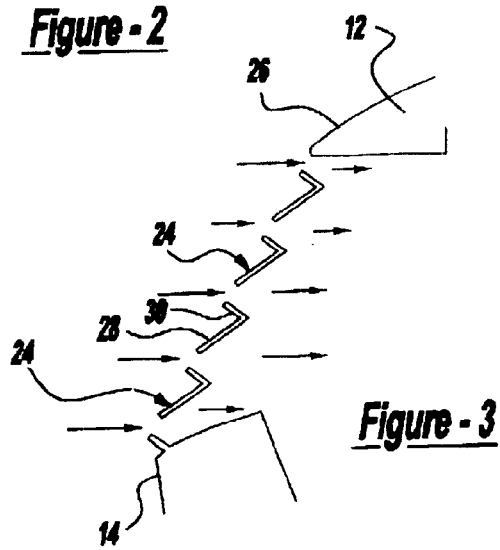
FIG. 3 is a cross-sectional view of a solid state drag reducing vehicle grille showing airflow at low vehicle speeds according to the present invention.

The specific passive design of the solid state drag reducing vehicle grille 18 allows for two different directions of airflow depending on vehicle 10 speed, while the solid state drag reducing vehicle grille's 18 geometry never changes. FIG. 3 shows airflow direction at low vehicle 10 speeds when airflow needs to travel through the solid state drag reducing vehicle grille 18 in order to reach the radiator to maintain vehicle 10 cooling requirements. The arrows indicate airflow. At low vehicle 10 speeds, airflow travels between the slats 24 to reach the radiator.

Figure 4:
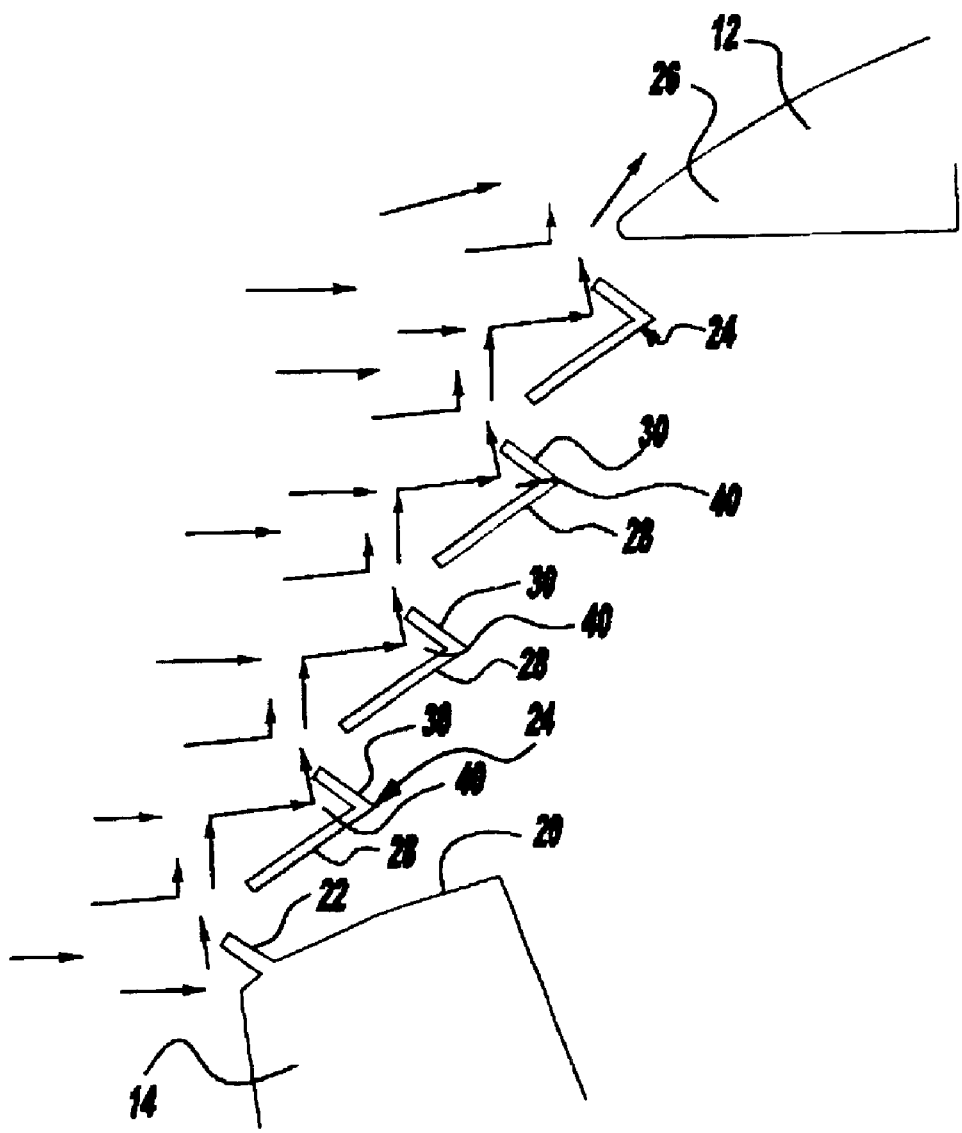
FIG. 4 is a cross-sectional view of a solid-state drag reducing vehicle grille showing airflow at high vehicle speeds according to the present invention.

At higher vehicle 10 speeds, the extra oncoming airflow does not need to pass through the solid-state drag reducing vehicle grille 18 to reach the radiator to cool the engine. Because of the specific design of the solid state drag reducing vehicle grille 18, the airflow passing through the slats 24 at high vehicle 10 speeds is only marginally more then at low speeds. Instead, referring to FIG. 4, when air hits the fin 22, the majority of air is pushed upward past the first slat 24 opening as shown by the arrows. As the air moves upward towards the lower portion 28 of the first slat 24, oncoming air pushes it into a stagnation area 40 created where the upper portion 30 and lower portion 28 of the slat 24 meet. This air pools and is then forced directly upward past the second slat 24 opening as shown by the arrows. This air then combines with oncoming air and it then pools in the stagnation area 40 of the next slat 24, and so on as shown by the arrows. When the air is pushed upward out of the stagnation area 40 of the uppermost slat 24, the air then goes over the top surface 26 of the hood 12.

While the majority of the oncoming airflow as a result of this pooling action is redirected at high vehicle speeds, a small amount does pass through the slats 24 of the solid-state drag reducing vehicle grille 18. Thus, the specific angles and lengths of the slats 24 of the solid state drag reducing vehicle grille 18 allow sufficient airflow at lower vehicle 10 speeds while actively managing, or redirecting, unneeded airflow at higher vehicle 10 speeds, thereby reducing aerodynamic drag and increasing fuel economy.

While only one embodiment of the solid state drag reducing vehicle grille of the present invention has been described, others may be possible without departing from the scope of the following claims.

What is claimed is:

1. A solid-state drag reducing vehicle grille for a vehicle comprising:
   a front bumper carried by the vehicle;
   left and right grille portions carried by the vehicle situated above the front bumper;
   a predetermined number of slats carried by the left and right grille portions such that each slat is situated a predetermined distance above and a predetermined distance rearward of the slat immediately beneath; and
   wherein the slats are adapted to allow air to flow between the slats at low vehicle speeds and to redirect airflow at high vehicle speeds.

2. The solid-state drag reducing vehicle grille as defined in claim 1, wherein the front bumper's upper surface has an upwardly and forwardly directed fin of predetermined thickness extending a predetermined distance.

3. The solid state drag reducing vehicle grille as defined in claim 2, wherein a first slat is situated a predetermined distance above and a predetermined distance rearward of the fin.

4. The solid state drag reducing vehicle grille as defined in claim 1, wherein the slats are substantially L-shaped in cross-section having a lower portion extending upwardly and rearward a predetermined length greater than an upper portion extending upwardly and forwardly, forming a stagnation area wherein at high vehicle speeds airflow is forced upward.

5. The solid state drag reducing vehicle grille as defined in claim 1, wherein the slats have a uniform cross-section for the entire length of the grille.

6. A solid-state drag reducing vehicle grille for a vehicle comprising:
   a front bumper having an upwardly and forwardly directed fin of predetermined thickness extending a predetermined distance carried by the vehicle;
   left and right grille portions carried by the vehicle situated above the front bumper; and
   a predetermined number of slats each having a lower portion extending upwardly and rearwardly a predetermined length greater than an upper portion extending upwardly and forwardly, forming a stagnation area wherein at high vehicle speeds airflow is forced upward, carried by the left and right grille portions.

7. The solid state drag reducing vehicle grille as defined in claim 6, wherein a first slat is situated a predetermined distance above and a predetermined distance rearward of the fin.

8. The solid state drag reducing vehicle grille as defined in claim 7, wherein a predetermined number of additional slats are situated a predetermined distance above and a predetermined distance rearward of each upwardly progressing slat.

9. The solid state drag reducing vehicle grille as defined in claim 6, wherein the slats have a uniform cross-section for the entire length of the grille.

10. A solid-state drag reducing vehicle grille for a vehicle comprising:
    a front bumper, having an upwardly and forwardly directed fin extending a predetermined distance, carried by the vehicle;
    left and right grille portions, carried by the vehicle, situated above the front bumper;
    a predetermined number of slats substantially L-shaped in cross-section each having a lower portion extending upwardly and rearwardly a predetermined length greater than an upper portion extending upwardly and forwardly, forming a stagnation area wherein at high vehicle speeds airflow is forced upward, carried by the left and right grille portions;
    wherein airflow is allowed to pass between the slats at low vehicle speeds; and
    wherein a predetermined amount of airflow is actively redirected upward over the slats at high vehicle speeds.

11. The solid state drag reducing vehicle grille as defined in claim 10, wherein a first slat is situated a predetermined distance above and a predetermined distance rearward of the fin.

12. The solid state drag reducing vehicle grille as defined in claim 11, wherein a predetermined number of additional slats are situated a predetermined distance above and a predetermined distance rearward of each upwardly progressing slat.

13. The solid state drag reducing vehicle grille as defined in claim 10, wherein the slats have a uniform cross-section for the entire length of the grille.

* * * * *